United States Patent [19]

Stiller

[11] 4,396,968

[45] Aug. 2, 1983

[54] FUSED DISTRIBUTION POWER SYSTEM WITH CLAMP DEVICE FOR PREVENTING ARC DAMAGE TO INSULATED DISTRIBUTION CONDUCTORS

[75] Inventor: Paul H. Stiller, North Huntingdon, Pa.

[73] Assignee: Westinghouse Electric Corp., Pittsburgh, Pa.

[21] Appl. No.: 421,532

[22] Filed: Sep. 22, 1982

[51] Int. Cl.[3] .......................... H02H 5/04; H02H 1/04; H02G 7/00

[52] U.S. Cl. .......................... 361/104; 24/135 K; 174/2; 174/40 R; 174/144; 361/117

[58] Field of Search .......................... 174/2, 40 R, 43, 44, 174/127, 135, 140 R, 144; 361/1, 104, 107, 117; 24/135 K; 339/263 R

[56] References Cited

U.S. PATENT DOCUMENTS

| | | | |
|---|---|---|---|
| 2,164,022 | 6/1939 | Rowe | 339/265 R |
| 2,868,861 | 1/1959 | Bither | 174/43 |
| 2,956,104 | 10/1960 | Bither | 174/44 |
| 3,046,327 | 7/1962 | Harmon | 174/127 X |
| 3,522,365 | 7/1970 | Dannes | 174/71 R X |
| 3,773,967 | 11/1973 | Sturm | 174/127 X |

FOREIGN PATENT DOCUMENTS

| | | | |
|---|---|---|---|
| 879234 | 11/1942 | France | 174/144 |
| 1463145 | 11/1966 | France | 339/265 R |

*Primary Examiner*—Laramie E. Askin

*Attorney, Agent, or Firm*—John L. DeAngelis, Jr.

[57] ABSTRACT

An insulated distribution conductor separated from the substation by one or more fuses is protected from arc damage by a clamp device having sufficient mass to absorb the arc energy and thereby prevent burndown and diameter reduction of the conductor at a point where the insulation covering has been removed. The clamp comprises two members which are bolted together to surround the bare section of the conductor and provide additional heat-absorbing mass at the point where the arc tends to dwell, i.e. at the end face of the insulation covering farthest from the power source.

15 Claims, 5 Drawing Figures

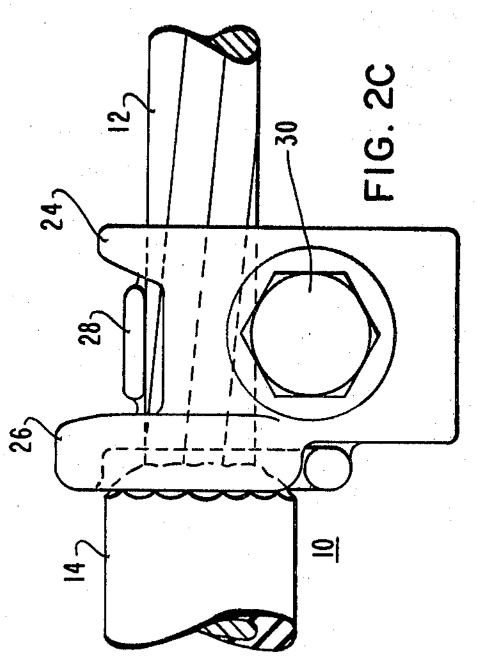
FIG. 2C
FIG. 2A
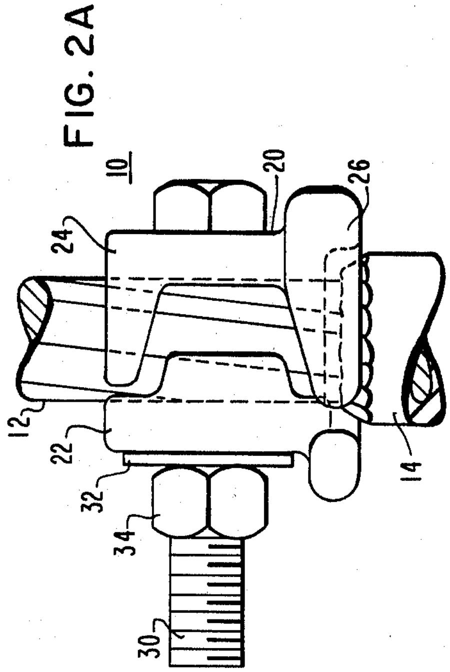
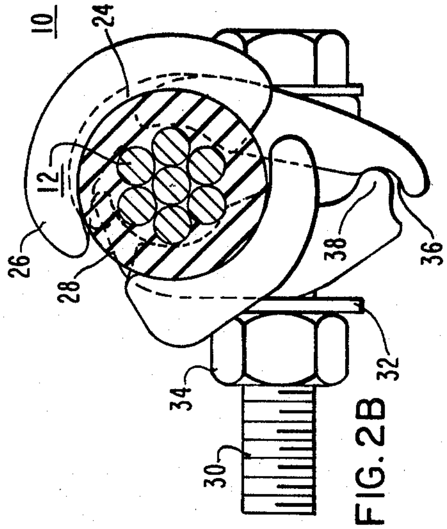
FIG. 2B

FUSED DISTRIBUTION POWER SYSTEM WITH CLAMP DEVICE FOR PREVENTING ARC DAMAGE TO INSULATED DISTRIBUTION CONDUCTORS

BACKGROUND OF THE INVENTION

1. Field of the Invention

This invention relates generally to distribution power systems including clamp devices for preventing arc damage to insulated distribution conductors, and especially to such systems protected by one or more fuses.

2. Description of the Prior Art

Electric power lines operating between 4 kV and 34 kV line-to-line are usually classified as distribution lines. In the United States, both bare and insulated distribution line conductors are used. Bare overhead distribution conductors are insulated from ground with standoff or string insulators connected to support poles. Insulated conductors, which comprise a significant percentage of installed power distribution lines, have an insulation cover to reduce hazards to life and property near the line. Insulated conductors also provide certain other advantages over bare conductor circuits. For example, momentary tree contact is less likely to fault a covered conductor than a bare conductor. Momentary line-to-line contact caused by wind deflection can fault a bare conductor circuit; a covered or insulated conductor circuit would be unaffected by such contact.

There is, however, the hazardous phenomenon of conductor burndown associated primarily with insulated distribution conductors. Lightning can strike an overhead distribution conductor anywhere along its length, often creating a fault current path by arcing to another conductor at a weak point (commonly known as lightning-induced flashover). The most probable arcing occurs with common vertical lines having current flowing between the top phase and the neutral conductor. Flashover can also occur from the top conductor to another phase conductor, sometimes involving all lines and the neutral.

After formation, the arc moves along the conductor away from the power source, due to electromagnetic forces. If the arc's travel is in some way restricted, the arc energy is concentrated on a small portion of the conductor. The concentrated energy causes the conductor to lose tensile strength, and it can eventually break and fall to the ground. This is the burndown phenomenon. The restriction can be caused by a puncture in or stripping away of the insulation covering of a distribution conductor, providing a highly probable lightning flashover path.

The amount of conductor damage at the point of arcing varies with the conductor temperature produced by the fault current heat which depends, in turn, on the magnitude and duration of the fault current. The magnitude of the fault current caused by the arc is a function of the line voltage, the circuit impedance, and other system parameters. Other conditions such as arc bending winds and humidity also affect the fault current magnitude. Fault current duration depends on the speed of the protective relays in opening the faulted circuit. Often, a single arcing event is sufficient to melt enough conductor to cause it to fall to the ground. In other cases, it may require two or three arc faults at the same point over a period of twenty or thirty years to produce burndown. Also, when the arc damage has reduced the current carrying capacity of the line, normal load current heating can sometimes cause burndown.

When an overhead conductor in a multi-grounded neutral distribution system breaks and falls to the ground without simultaneously contacting the multi-grounded neutral conductor, there is a significant probability of it coming to rest on a high impedance surface such as concrete, asphalt, or dry earth. The resulting fault current may be insufficient to cause operation of the protective relaying equipment. The problem is further aggravated by use of covered phase conductors that may increase the fault impedance and further reduce the fault current magnitude. In addition to interrupting customer service, the undetected live wire is a threat to public safety and a fire hazard.

Clearly, to improve on the known reliability and safety advantages of insulated distribution lines, conductor arcing damage must be avoided where the insulation is stripped off for interconnection or support. Thus, covered conductors must be protected from burndown.

Two pending patent applications, U.S. patent application Ser. No. 248,788, filed Mar. 30, 1981 and U.S. patent application Ser. No. 248,789, filed Mar. 30, 1981, both assigned to the assignee of the present invention, teach another embodiment of the metallic clamp claimed in the present invention. Removal of the insulating cover from a distribution line conductor exposes a bare conductor segment and forms two insulating cover end faces. The prior art clamp is securely fastened to the bare conductor segment, adjacent to the end face that is farthest from the power source (in a radial distribution circuit) to provide additional heat sink mass on that portion of the bare conductor segment where the fault-current arc dwells. The bare conductor passes continuously through the clamp. Since the clamp, rather than the bare conductor, absorbs the arc energy, conductor burndown is prevented.

The prior art clamp includes an enlarged flange portion placed in proximate relation to the end face to provide additional metallic mass and to bar arc travel from the clamp to the insulating cover. The prior art clamp also includes splatter shields located on that face of the clamp opposite the enlarged flange portion for preventing molten metal, produced when the clamp absorbs the arc energy, from splattering onto the support insulator(s). Longitudinal slots of optimum width are specifically designed into the clamp to prevent the upper and lower clamp members from welding together when the arc energy is absorbed, while preventing arc travel along that portion of the conductor exposed by the slots. Lastly, in the prior art clamp, the bolt holding the clamp members together is embedded in the clamp over nearly the bolt's entire length. This design feature prevents the arc from jumping from the clamp to the bolt tip, and welding the tip to the clamp.

Distribution lines are protected from faults by protective relays operating interrupt devices, or fuses; the latter are used on approximately 60–75% of all overhead distribution lines. On distribution lines using only protective relays operating interrupt devices, the arc can last for 6–12 cycles before the protective relay opens the interrupt device to extinguish the arc. The arc's duration requires that the prior art clamp mass be proportional to the arc energy. Theoretical and empirical studies were used to determine the proper mass for the prior art clamp. Before it is extinguished, the arc causes the entire mass of the prior art clamp to be heated. Consideration must therefore be given to heat transfer and distribution in the prior art clamp and it must be contoured accordingly. On fused lines, however, the arc is extinguished after approximately ½ cycle by opening of the fuse. More arc energy must therefore be dissipated by clamps used on lines protected by protective relays in conjunction with interrupt devices than those protected by fuses.

The prior art clamp, designed for distribution lines protected by protective relays, has substantial mass, and cost, due to the large amount of arc energy it must absorb. The geometry is also complicated by the large heat-sinking capabilities required and heat transfer and distribution throughout the clamp. Of course, this complicated geometry adds to fabrication cost. Recognition of the shorter arc-time associated with fuse-protected distribution lines allows several improvements to be made in the prior art clamp without sacrificing its protection features. The most significant improvement involves mass reduction. Empirical studies have indicated that for fused lines, the clamp mass necessary for practical structural characteristics is sufficient to provide adequate heat-sink mass for the largest available fuse, i.e., the fuse which would take the longest time to extinguish the arc. That is, the amount of mass of the present clamp necessary to give it the required structural features is sufficient to absorb the arc energy on any fused distribution line because the fuse limits the arc's duration. The clamp of the present invention, intended for use only on fuse-protected lines, has approximately ⅓ the mass of the prior art clamp. The prior art clamp has a mass of 294 g, and the present clamp has a mass of 92.1 g. This mass reduction translates into a ⅓ cost reduction. These and other advantages of the present invention are discussed below.

SUMMARY OF THE INVENTION

A clamp for protecting a fused distribution power line from fault current arc damage is disclosed. When the insulation cover is removed from a distribution power line conductor there exists a high probability for a fault current arc to dwell on the bare conductor at the insulation end face farthest from the power source. The device of the present invention is adapted for installation on the bare portion of the distribution conductor such that the distribution conductor passes continuously therethrough. The clamp of the present invention adds sufficient mass and therefore has the capability of absorbing arc energy that would otherwise cause reduction in the cross-sectional area of the conductor and perhaps eventually cause it to break and fall to the ground, i.e. conductor burndown.

In contrast to the prior art clamp, the clamp of the present invention, a "low energy" clamp, is intended for use only on distribution power lines separated from the substation by one or more fuses. Although these fuses generally interrupt fault current before sufficient energy can be concentrated on a conductor to cause burndown, conductor damage in the form of reduced cross-section can result.

Since the arc duration of a fuse-protected line is short, relative to a protective relay-protected line, the arc energy is concentrated in the present clamp structure because it lacks sufficient time to flow throughout the clamp before arc extinguishment. This allows the present clamp, unlike the prior art clamp, to be designed without consideration for heat transfer characteristics; it therefore has a simpler geometry and significantly reduced cost.

In contrast to the embedded-bolt feature of the prior art clamp, the bolt of the present clamp extends beyond the clamp body. Extensive experimentation indicated that the embedded-bolt feature is unnecessary for fuse-protected lines due to the arc's short duration. Therefore, the bolt of the instant clamp is not embedded therein. This aspect of the clamp allows further reduction in clamp mass. Also, on fused lines protected with a prior art clamp very little splatter of molten metal is observed and there is little tendency for the clamp members to weld together. Further cost reduction and simplification of the prior art clamp are therefore due to the elimination of the splatter shields and reduction of the width of the anti-weld slots.

BRIEF DESCRIPTION OF THE DRAWINGS

The invention may be better understood, and further advantageous and uses thereof more readily apparent, when considered in view of the following description of exemplary embodiments, taken with the accompanying drawings in which:

FIGS. 2A, 2B, and 2C show three views of a preferred embodiment of the clamp of FIGS. 1A and 1B in detail.

DESCRIPTION OF THE PREFERRED EMBODIMENT

Figure 1A:
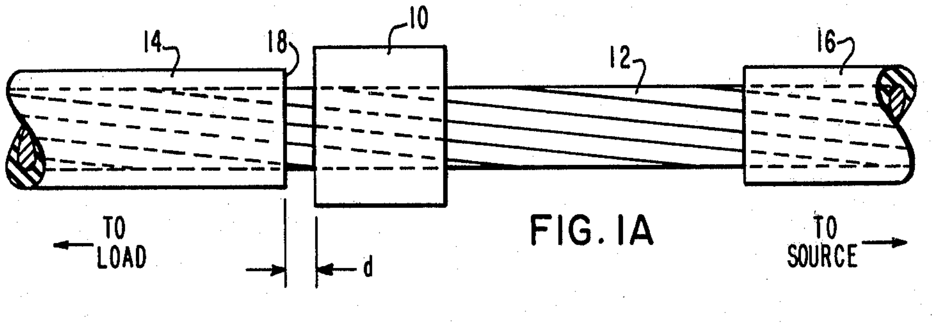
FIG. 1A shows the relationship between the clamp and the distribution line conductor to which it is attached for a radial type distribution circuit.

FIG. 1A shows a clamp 10 installed on a distribution power line conductor 12 for preventing arc damage to the conductor 12. A portion of the conductor 12 is covered by insulating covers 14 and 16, leaving a bare segment of the conductor 12 between insulating covers 14 and 16. The insulating cover 14 has an end face 18. The bare segment of the conductor 12 is used to attach the conductor 12 to a support insulator (not shown in FIG. 1A) or connect another conductor thereto (not shown in FIG. 1A).

Lightning-induced arcs can occur on the bare segment of the conductor 12 and after formation, tend to move away from the source. The insulating cover 14 restricts further travel of the arc, causing the arc to dwell at a point on the bare segment of the conductor 12 adjacent to the end face 18. When the arc dwells at a point on the conductor 12, it causes the diameter of the conductor 12 to be reduced. This diameter reduction causes loss of tensile strength, and may eventually cause the conductor 12 to break and fall to the ground.

To prevent conductor damage, the clamp 10 is secured to the bare segment of the conductor 12 to absorb the damaging arc energy. FIG. 1A depicts a radial-type distribution circuit and illustrates the direction to the source and load in this circuit. The load is always in one direction and the source in another.

The distance between the clamp 10 and the end face 18 is labeled d in FIG. 1A. This distance, d, must be less than 1.5 cm; a larger value would cause the arc to move off of the clamp 10 and onto the bare segment of the conductor 12 as the arc moves away from the source.

Figure 1B:
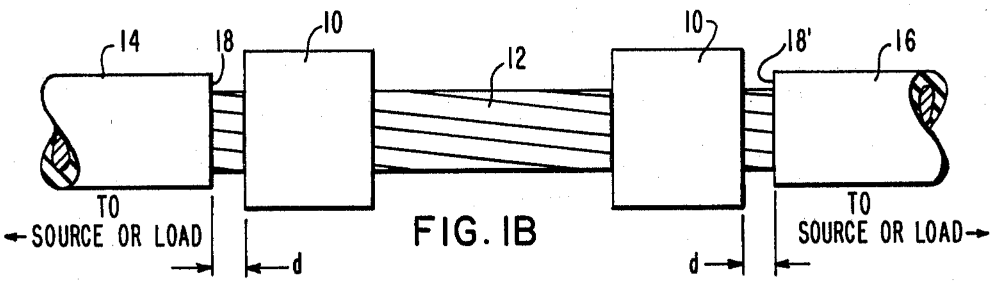
FIG. 1B shows the relationship between the clamp and the distribution line conductor to which it is attached for a loop or network type distribution circuit.

FIG. 1B shows proper placement of the clamp 10 in a loop or network-type distribution circuit. With this distribution circuit the load and source may be switched under various operation conditions. For proper protection, a clamp 10 must be placed adjacent the end face 18 and an end face 18'. This configuration is necessary because the clamp 10 must be placed farthest from the source, and the source can be located in either direction in a loop or network distribution circuit.

Turning to FIG. 2A, there is shown a detailed top view of the clamp 10. Also depicted are the conductor 12 and the insulating cover 14. The clamp 10 comprises a first member 20 and a second member 22. The first member 20 and the second member 22 cooperate so as to form a conductor channel through which the bare segment of the conductor 12 passes.

The first member 20 includes fingers 24 and 26 which define a notch in the first member 20. A flange 28 in the second member 22 engages the notch in the first member 20. The finger 26 also includes a recess so that a portion of the insulating cover 14 can extend into the finger 26. A bolt 30, with a washer 32 and a nut 34, secures the first member 20 and the second member 22 together so that the bare segment of the conductor 12 passes continuously therethrough.

The elements of FIG. 2B are identical in structure and function to the elements bearing identical reference characters in FIG. 2A. In FIG. 2B there can be seen a groove 36 in the first member 20 which engages a flange 38 in the second member 22. This arrangment is provided to more securely hold the first member 20 and the second member 22 together. Also, interaction of the flange 38 and the groove 36 acts like a hinge allowing the clamp 10 to be installed and removed from the conductor 12 without separating the first member 20 from the second member 22. By unscrewing the nut 34 the conductor channel can be opened to a distance sufficient for the bare segment of the conductor 12 to pass through.

FIG. 2C illustrates a side view of the clamp 10. The elements of FIG. 2C are identical in structure and function to the elements bearing identical reference characters in FIG. 2A. No new elements of the clamp 10 are illustrated in FIG. 2C; this figure is included solely to provide a better understanding of the structure of the clamp 10.

Several important features of the clamp 10 warrant further discussion. Since the clamp 10, under normal conditions, remains idle for many years between arc strikes, it is important that a good electrical connection be maintained between the clamp 10 and the conductor 12 at all times. Chemical corrosion inhibitors should be used if the clamp 10 and the conductor 12 are made of dissimilar materials. If the conductor 12 is composed of aluminum, the clamp 10 should also be made of aluminum. The use of the same material for the clamp 10 and the conductor 12 also helps to prevent differential thermal expansion between the clamp 10 and the conductor 12.

The surface area contact between the clamp 10 and the conductor 12 must be sufficient to carry the fault current. Experimentation has shown that a sufficient area is equal to or greater than the cross-sectional area of the conductor 12.

Although the clamp 10 must be of sufficient mass to absorb the arc energy, the clamp 10 cannot be so massive that the conductor 12 is stressed such that creep occurs therein. Also, proper placement of the clamp 10 on the conductor 12 is important to reduce creep.

As previously discussed, the geometry of the clamp 10 with respect to heat transfer is insignificant because the energy of the arc is locally concentrated in the clamp 10 and does not have sufficient time to flow throughout the clamp 10. Nonetheless, certain geometrical features of the clamp 10 are desirable. It is important that the clamp 10 be designed for easy, one-piece installation on and removal from the conductor 12. As noted above, the clamp 10 must be securely fastened to the conductor 12 to withstand approximately 30 years of operation. Lastly, the clamp 10 must not generate excessive electromagnetic radiation; the edges thereof should be rounded to prevent interference with communications. The foregoing design parameters are achieved in the clamp 10 illustrated in FIGS. 2A, 2B, and 2C. The clamp 10 is capable of attachment to a conductor 12 having a diameter from 0.31 inch to 0.57 inch.

What is claimed is:

1. A fused distribution power system protected from damage caused by an arc, said distribution power system comprising:

a distribution substation;

a fuse for extinguishing the arc, thereby limiting the arc energy to less than a predetermined value;

an electrical conductor connected to said distribution substation via said fuse, said electrical conductor surrounded by an insulating cover, with a section of said insulating cover being removed thereby forming two insulating cover end faces and an intervening bare segment of said electrical conductor wherein the arc tends to dwell on said intervening bare segment before extinguishment;

metallic arc protection clamp means secured in electrical communication with said bare segment and substantially surrounding said intervening bare segment and with the spacing between said clamp means and a one of said two insulating cover end faces being less than a predetermined distance, said clamp means having a predetermined mass sufficient for dissipating the arc energy up to but not in excess of said predetermined value.

2. The system of claim 1 wherein the clamp means includes a raised shoulder portion completely encircling the bare segment and adjacent the one of the two insulating cover end faces.

3. The system of claim 1 wherein the clamp means includes:

an upper member having first and second axial grooves on the bottom face thereof and said upper member having a vertical hole therethrough in perpendicular relation to said first and second axial grooves;

a lower member having a first axial flange on the top face thereof for engaging said first axial groove of said upper member, said lower member having an axial groove on the top face thereof such that said second axial groove of said upper member and said axial groove of said lower member cooperate to form an axial channel for the intervening bare segment to pass through, and said lower member having a vertical hole therethrough in perpendicular relation to said axial groove thereof; and bolt means passing through said vertical hole of said upper member and said vertical hole of said lower member for securing said upper member and said lower member together.

4. The system of claim 3 wherein the mass of said clamp means is determined by the structural features of the upper member, the lower member, and the bolt means.

5. The system of claim 3 wherein the upper member includes first and second finger means adjacent to the second axial groove, said first and second finger means having a downward curvature from the upper member and defining a notch therebetween, and wherein the lower member includes a second flange for engaging said notch.

6. The system of claim 1 wherein the diameter of the bare conductor section is limited to a range of 0.31 inch to 0.57 inch.

7. The system of claim 1 wherein the clamp means is made of aluminum.

8. The system of claim 1 wherein the predetermined distance is 1.5 cm.

9. The system of claim 1 wherein the predetermined mass is 92.1 g.

10. A fused distribution power system protected from damage caused by an arc, said distribution power system comprising:

a distribution substation;

a fuse for extinguishing the arc, thereby limiting the arc duration;

an electrical conductor connected to said distribution substation via said fuse, said electrical conductor surrounded by an insulating cover, with a section of said insulating cover being removed thereby forming two insulating cover end faces and an intervening bare segment of said electrical conductor wherein the arc tends to dwell on said intervening bare segment before extinguishment;

metallic arc protection clamp means secured in electrical communication with said bare segment and substantially surrounding said intervening bare segment and with the spacing between said clamp means and a one of said two insulating cover end faces being less than a predetermined distance, said clamp means having a predetermined mass dependent on the duration of the arc as limited by said fuse.

11. The system of claim 10 wherein the predetermined distance is 1.5 cm.

12. The system of claim 10 wherein the predetermined mass is 92.1 g.

13. A fused distribution power system protected from damage caused by an arc, said distribution power system comprising:

a distribution substation;

a fuse for extinguishing the arc;

an electrical conductor connected to said distribution substation via said fuse, said electrical conductor surrounded by an insulating cover, with a section of said insulating cover being removed thereby forming two insulating cover end faces and an intervening bare segment of said electrical conductor wherein the arc tends to dwell on said intervening bare segment before extinguishment;

metallic arc protection clamp means secured in electrical communication with said bare segment and substantially surrounding said intervening bare segment and with the spacing between said clamp means and a one of said two insulating cover end faces being less than a predetermined distance, said clamp means having a mass of about $\frac{1}{3}M$, wherein M is the mass that would be required in an unfused distribution power system.

14. The system of claim 13 wherein the predetermined distance is 1.5 cm.

15. The system of claim 13 wherein the mass of the clamp means is 92.1 g.

* * * * *